US008098349B2

(12) United States Patent
Hung et al.

(10) Patent No.: US 8,098,349 B2
(45) Date of Patent: Jan. 17, 2012

(54) BACKLIGHT MODULE AND DOUBLE-SIDED LIQUID CRYSTAL DISPLAY DEVICE

(75) Inventors: Mau-Yuan Hung, Hsin-Chu (TW); Sheng-Chieh Lung, Hsin-Chu (TW); Teng-Piau Peng, Hsin-Chu (TW)

(73) Assignee: Au Optronics Corp., Hsin-chu (TW)

( * ) Notice: Subject to any disclaimer, the term of this patent is extended or adjusted under 35 U.S.C. 154(b) by 348 days.

(21) Appl. No.: 12/421,898

(22) Filed: Apr. 10, 2009

(65) Prior Publication Data
US 2010/0171904 A1 Jul. 8, 2010

(30) Foreign Application Priority Data

Jan. 6, 2009 (TW) .............................. 98100199 A

(51) Int. Cl.
*G02F 1/1335* (2006.01)
(52) U.S. Cl. ........................................... 349/67
(58) Field of Classification Search ...... 349/67
See application file for complete search history.

(56) References Cited

U.S. PATENT DOCUMENTS 5,274,533 A * 12/1993 Neary et al. .................. 362/225
7,106,394 B2 * 9/2006 Ono et al. ..................... 349/62
7,594,744 B2 * 9/2009 Liu et al. ....................... 362/625
2002/0064037 A1 * 5/2002 Lee ................................ 362/31
2004/0189892 A1 * 9/2004 Ono et al. ..................... 349/64

FOREIGN PATENT DOCUMENTS

| CN | 1534353 A | 10/2004 |
| CN | 1567057 A | 1/2005 |
| CN | 101211066 A | 7/2008 |
| TW | 564302 | 12/2003 |
| TW | I285282 | 4/2005 |
| TW | I252950 | 9/2005 |
| TW | M319427 | 9/2007 |

* cited by examiner

*Primary Examiner* — Sung Pak
(74) *Attorney, Agent, or Firm* — Chun-Ming Shih

(57) ABSTRACT

A backlight module includes a plate and a plurality of light sources. The plate has a first surface and a second surface opposite to the first surface. The plate is bent to form a plurality of first grooves on the first surface and a plurality of second grooves on the second surface. The light sources are respectively disposed in the first grooves and the second grooves. The backlight module is capable of providing two plane light sources to different directions and has thinner thickness. A double-sided liquid crystal display using the above-mentioned backlight module is also provided.

18 Claims, 19 Drawing Sheets

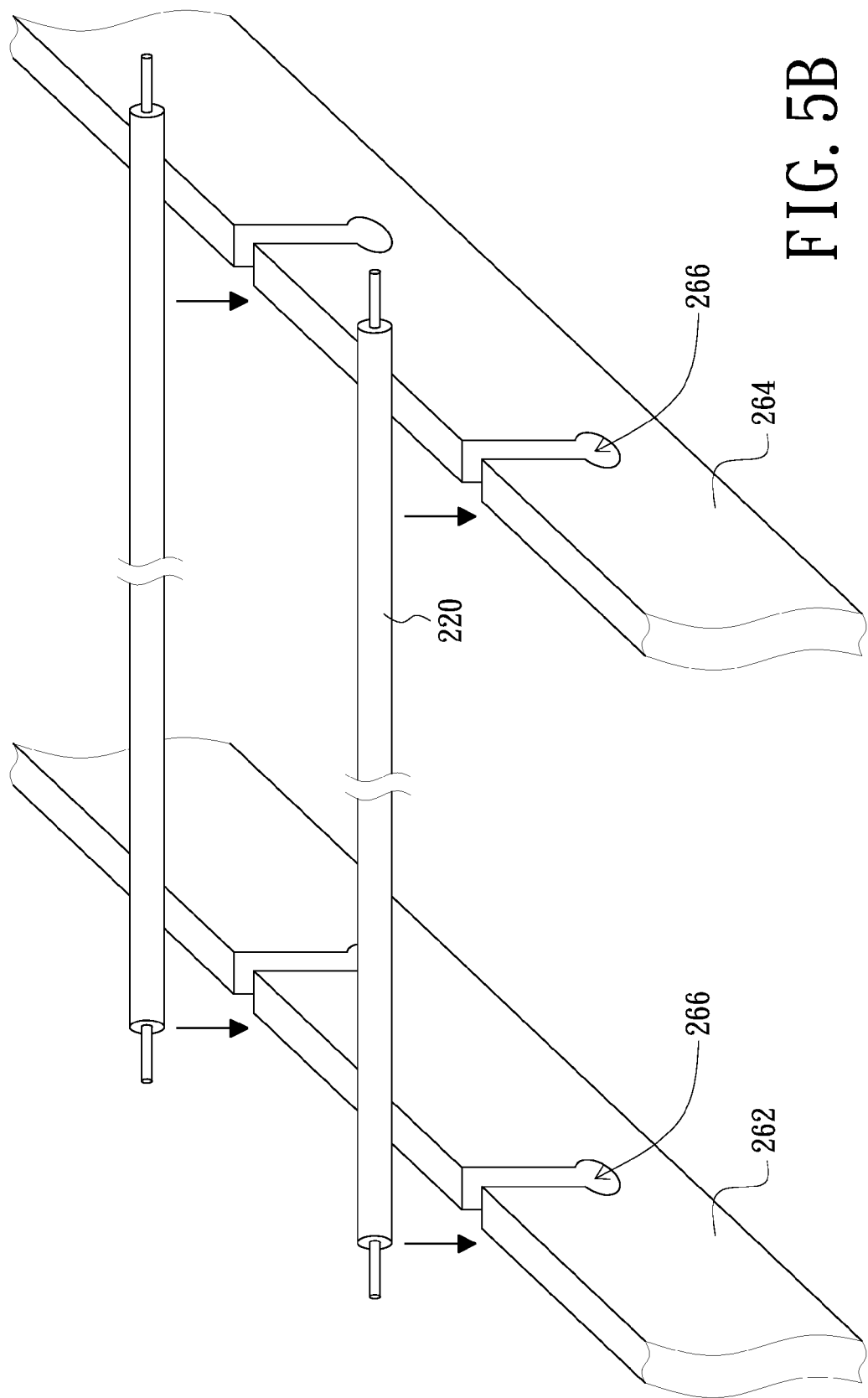

BACKLIGHT MODULE AND DOUBLE-SIDED LIQUID CRYSTAL DISPLAY DEVICE

CROSS-REFERENCE TO RELATED APPLICATIONS

This application is based upon and claims the benefit of priority from the prior Taiwanese Patent Application No. 098100199, filed Jan. 6, 2009, the entire contents of which are incorporated herein by reference.

BACKGROUND

1. Field of the Invention

The present invention relates to a liquid crystal display device, and particularly to a double-sided liquid crystal display device and a backlight module thereof.

2. Description of the Related Art

With the progress of liquid crystal display techniques and the liquid crystal display devices have the advantages of light in weight and small in size, the liquid crystal display devices have been widely used in many kinds of electronic products, such as digital camera, personal digital assistant (PDA), mobile phone, notebook computer, thin-type flat panel television, and etc. The liquid crystal display device includes a liquid crystal display panel and a backlight module, wherein the backlight module is for providing plane light source to the liquid crystal display panel. Moreover, in order to satisfy different requirements, a double-sided liquid crystal display device, which is capable of displaying two frames at the same time, has been developed.

FIG. 1 is a schematic view of a conventional double-sided liquid crystal display device. Referring to FIG. 1, the conventional double-sided liquid crystal display device 100 is composed of two back-to-back liquid crystal display devices 110. Each of the liquid crystal display devices 110 includes a liquid crystal display panel 112 and a backlight module 114. The backlight module 114 includes a reflection plate 114a and a plurality of cold cathode fluorescent lamps (CCFLs) 114b. The cold cathode fluorescent lamp 114b are for providing light to the liquid crystal display panel 112, while the reflection plate 114a is for reflecting the light to the liquid crystal display panel 112.

The fact that the conventional double-sided liquid crystal display device 100 is composed of two back-to-back liquid crystal display devices 110 makes the liquid crystal display device 100 have a thick thickness. More concretely, in each of the liquid crystal display devices 110, a distance between the center of the cold cathode fluorescent lamp 114b and the reflection plate 114a is D1, a distance between the center of the cold cathode fluorescent lamp 114b and the liquid crystal display panel 112 is D2, the thickness of the reflection plate 114a is D4, the thickness of the liquid crystal display panel 112 is D5, and a distance between the two reflection plates 114a is D3. Therefore, the thickness of the conventional double-sided liquid crystal display device 100 is 2*(D1+D2+D4+D5)+D3.

FIG. 2 is a schematic view of another conventional double-sided liquid crystal display device. Referring to FIG. 2, in order to satisfy the thin-type requirement in electronic products, the conventional art provides another double-sided liquid crystal display device 100', which includes two liquid crystal display panels 112 and a backlight module 120 disposed between the liquid crystal display panels 112. The backlight module 120 includes a reflection plate 122, a plurality of cold cathode fluorescent lamps 124 and a plurality of cold cathode fluorescent lamps 126, wherein the cold cathode fluorescent lamps 124 and 126 are disposed at two opposite sides of the reflection plate 122.

A distance between the center of the cold cathode fluorescent lamp 124/126 and the reflection plate 122 is D1, a distance between the center of the cold cathode fluorescent lamp 124/126 and the liquid crystal display panel 112 is D2, the thickness of the reflection plate 122 is D4, and the thickness of the liquid crystal display panel 112 is D5. Therefore, the thickness of the double-sided liquid crystal display device 100' is 2*(D1+D2+D5)+D4. As compared to the double-sided liquid crystal display device 100, the double-sided liquid crystal display device 100' decreases a thickness of D4+D3.

The reason for the thickness decrease of the conventional double-sided liquid crystal display device 100' is uniting two backlight modules together to form a single piece. Therefore, if a backlight module with thinner thickness is provided, the thickness of the double-sided liquid crystal display device may further be decreased, which strengthens market competitiveness of the double-sided liquid crystal display device.

BRIEF SUMMARY

The present invention provides a backlight module with thinner thickness.

The present invention also provides a backlight module which is suitable for applying to a double-sided liquid crystal display device for decreasing thickness of the double-sided liquid crystal display device.

The present invention further provides a double-sided liquid crystal display device with thinner thickness.

In order to achieve the above-mentioned advantages, the present invention provides a backlight module, which includes a plate and a plurality of light sources. The plate has a first surface and a second surface opposite to the first surface. The plate is bent to form a plurality of first grooves on the first surface and a plurality of second grooves on the second surface. The light sources are respectively disposed in the first grooves and the second grooves.

In one embodiment of the present invention, each of the light sources is, for example, a cold cathode fluorescent lamp, and extension directions of the cold cathode fluorescent lamps are parallel to extension directions of the first grooves and the second grooves.

In one embodiment of the present invention, each of the light sources includes a strip substrate and at least a point light source disposed on the strip substrate, and extension directions of the strip substrates are parallel to the extension directions of the first grooves and the second grooves.

In one embodiment of the present invention, the first grooves and the second grooves are V-shaped grooves, and the second grooves are separately disposed between the first grooves.

In one embodiment of the present invention, the plate includes a plurality of V-shaped plates.

In one embodiment of the present invention, each of the V-shaped plates is composed of two flat plates.

In one embodiment of the present invention, the first grooves and the second grooves are semi-circular grooves, and the second grooves are separately disposed between the first grooves.

In one embodiment of the present invention, the plate includes a plurality of first semi-circular plates and a plurality of second semi-circular plates. Concave surfaces of the first semi-circular plates and concave surfaces of the second semi-circular plates face different sides of the plate.

In one embodiment of the present invention, the plate further includes a plurality of flat plates. Each of the flat plates is connected between the adjacent first semi-circular plate and second semi-circular plate.

In one embodiment of the present invention, both of the first surface and the second surface are reflection surfaces.

In one embodiment of the present invention, bottom portions of the first grooves and the second grooves respectively have an opening.

In one embodiment of the present invention, a material of the plate includes transparent material, and the transparent material is suitable for reflecting a part of light and passing through another part of the light.

In one embodiment of the present invention, the backlight module further includes a first optical sheet and a second optical sheet, the first optical sheet faces to the first surface of the plate, and the second optical sheet faces to the second surface of the plate.

In one embodiment of the present invention, the backlight module further includes a plurality of support members abutted between the first optical sheet and the plate and between the second optical sheet and the plate.

In one embodiment of the present invention, each support member includes a fixing end and a top end opposite to the fixing end. The top end of the support member is abutted against the first optical sheet or the second optical sheet. The fixing end includes at least a hook, and the plate has a plurality of through holes corresponding to the hooks of the fixing ends. The through holes are disposed at bottom portions of the first grooves and the second grooves, and the hooks pass through the corresponding through holes and are fixed to the plate.

In order to achieve the above-mentioned advantages, the present invention further provides a backlight module including a first optical sheet, a second optical sheet, a plurality of light sources, and a plurality of plates. The second optical sheet faces the first optical sheet. The light sources are disposed between the first optical sheet and the second optical sheet, while the plates are separately disposed between the light sources. Each of the light sources is for providing light to the first optical sheet and the second optical sheet. Each of the plates has a first surface and a second surface opposite to the first surface. Both of the first surface and the second surface are reflection surfaces.

In one embodiment of the present invention, each of the light sources is, for example, a cold cathode fluorescent lamp.

In one embodiment of the present invention, each of the light sources includes a strip substrate and at least two point light sources. The strip substrate has a third surface and a fourth surface opposite to the third surface. The point light sources are respectively disposed on the third surface and the fourth surface.

In one embodiment of the present invention, each of the plates is a flat plate.

In one embodiment of the present invention, each of the plate is bent to form an arc groove on the first surface and an arc groove on the second surface.

In order to achieve the above-mentioned advantages, the present invention further provides a double-sided liquid crystal display device includes two liquid crystal display panels and a backlight module disposed between the liquid crystal display panels. The backlight module may be one of the above-mentioned two backlight modules.

In the backlight module of each embodiment of the present invention, because the light sources for providing light to different liquid crystal display panels may be located on one reference plane, the thickness of the backlight module is therefore decreased. Because the backlight module applied to the double-sided liquid crystal display device has thinner thickness, the double-sided liquid crystal display device accordingly has thinner thickness.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5B is a schematic three-dimensional view showing two ends of the light sources being fixed to two opposite sidewalls of the fixing frame of FIG. 5A.

DETAILED DESCRIPTION

Figure 3:
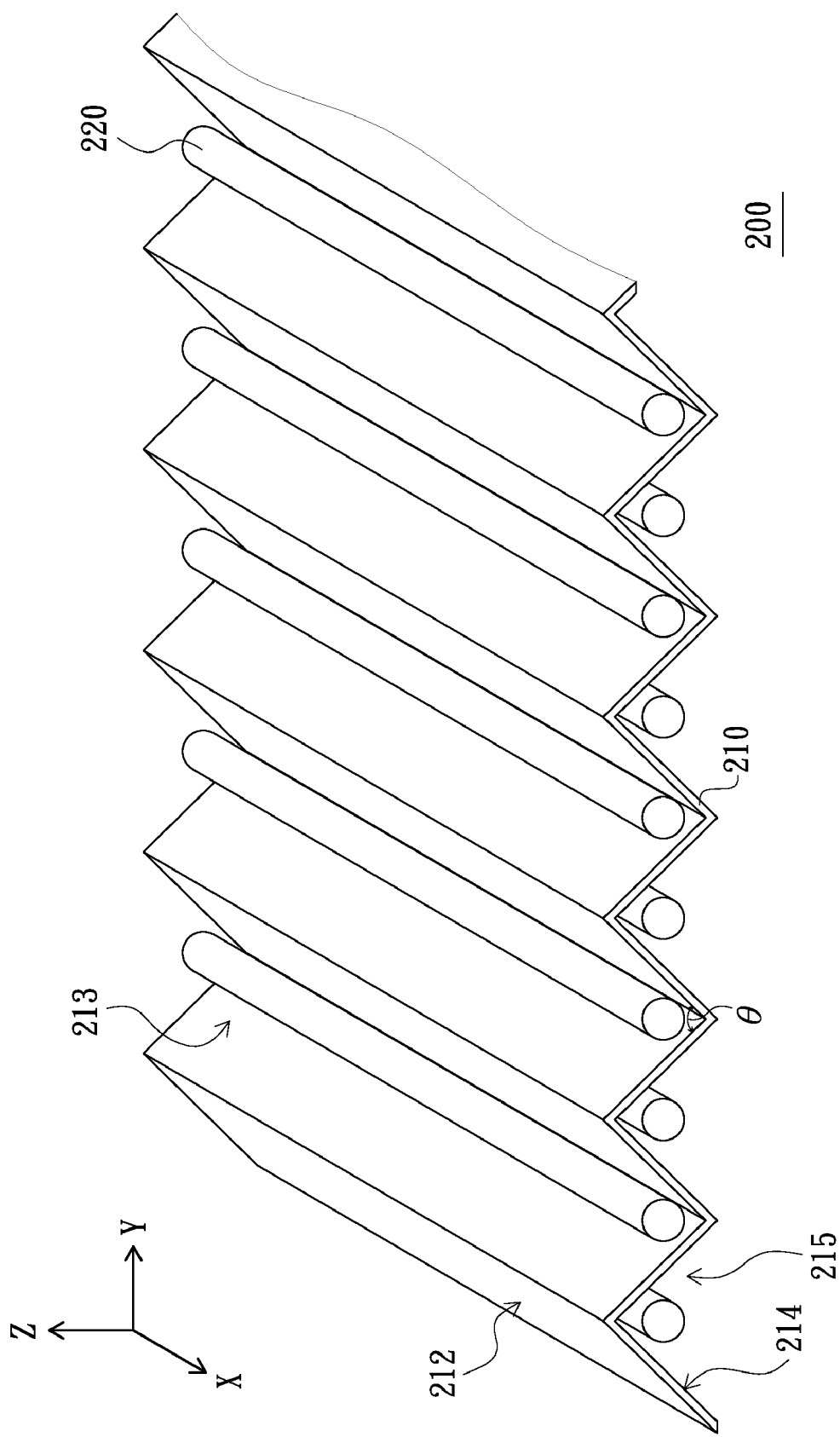
FIG. 3 is a schematic three-dimensional view of a backlight module according to an embodiment of the present invention.

FIG. 3 is a schematic three-dimensional view of a backlight module according to an embodiment of the present invention. Referring to FIG. 3, the backlight module 200 of the present embodiment includes a plate 210 and a plurality of light sources 220. The plate 210 has a first surface 212 and a second surface 214 opposite to the first surface 212. The plate 210 is bent to form a plurality of first grooves 213 on the first surface 212 and a plurality of second grooves 215 on the second surface 214. The light sources 220 are respectively disposed in the first grooves 213 and the second grooves 215.

In the above-mentioned backlight module 200, each of the light sources 220 is, for example, a cold cathode fluorescent lamp. Extension directions of the light sources 220 are parallel to extension directions of the first grooves 213 and the second grooves 215. In this embodiment, the extension directions of the light sources 220, the first grooves 213 and the second grooves 215 are, for example, parallel to X-axis. The first grooves 213 and the second grooves 215 are, for example, V-shaped grooves, and the second grooves 215 are separately disposed between the first grooves 213. An included angle θ formed between two inclined surfaces of the V-shaped groove is in a range from 30° to 160°. A degree of the included angle θ can be adjusted according to distance change between adjacent two light sources 220. Generally speaking, the larger the distance between the two adjacent light sources 220 is, the larger the included angle θ is.

Figure 4A:
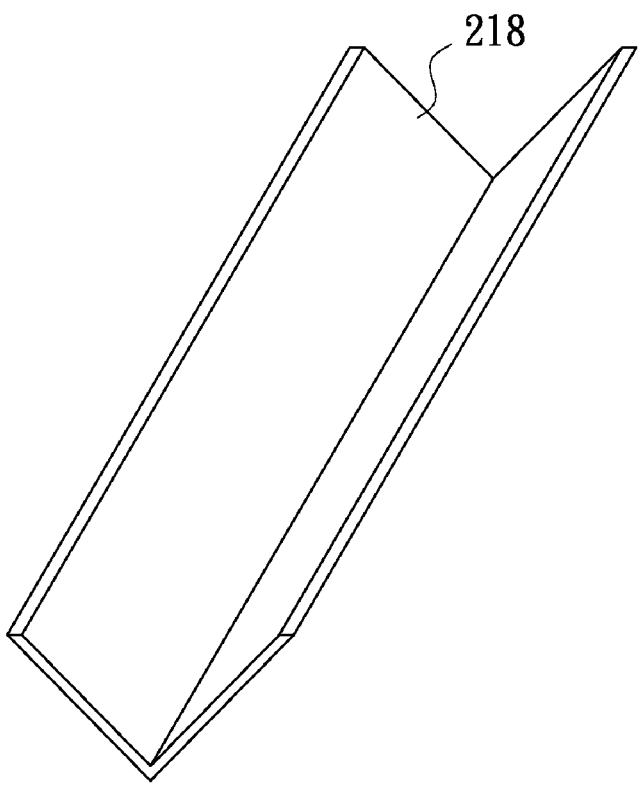
FIG. 4A is a schematic three-dimensional view of a V-shaped plate of an embodiment of the present invention.
Figure 4B:
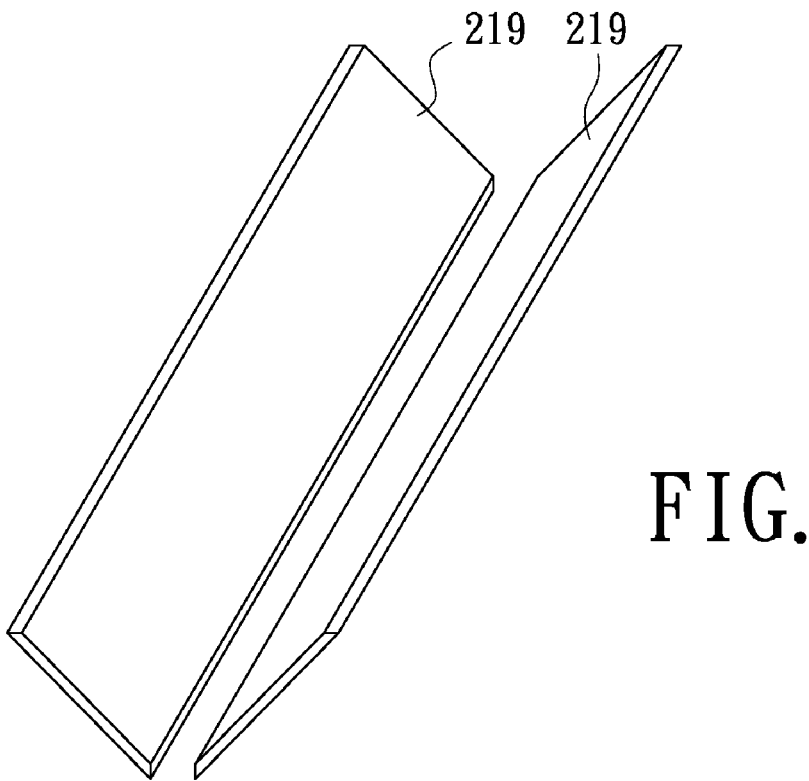
FIG. 4B is a schematic three-dimensional view of a V-shaped plate of another embodiment of the present invention.

Both of the first surface 212 and the second surface 214 are, for example, reflection surfaces for reflecting light provided by the light sources 220. The plate 210 may be bent from a single plate, or is composed of a plurality of V-shaped plates 218 (referring to FIG. 4A). Each of the V-shaped plates 218 may be composed of two flat plates 219 (referring to FIG. 4B).

Figure 5A:
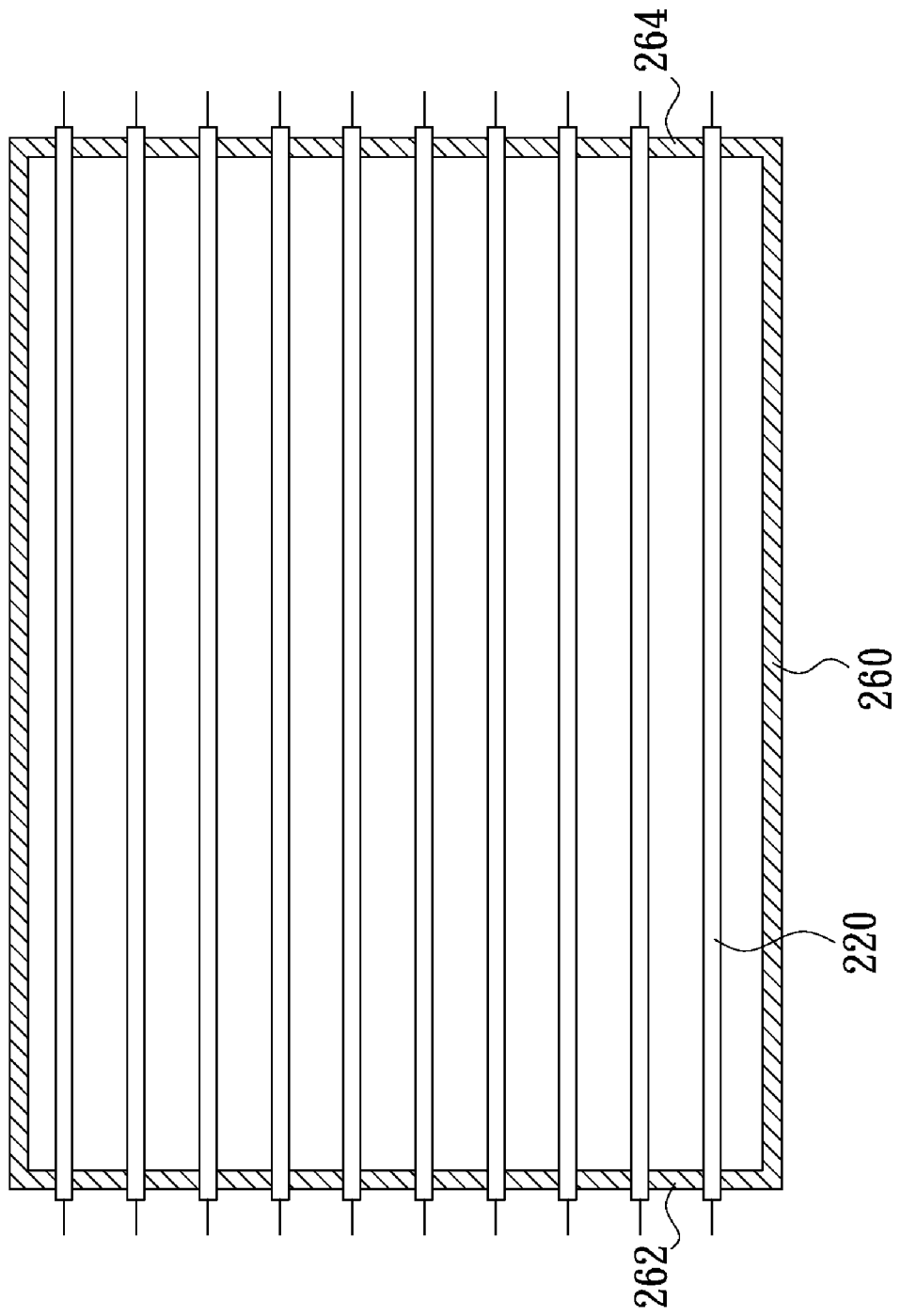
FIG. 5A is a schematic view showing the light sources of the backlight module of FIG. 3 being fixed to a fixing frame.

FIG. 5A is a schematic view showing the light sources of the backlight module of FIG. 3 being fixed to a fixing frame, and FIG. 5B is a schematic three-dimensional view showing two ends of the light sources being fixed to two opposite sidewalls of the fixing frame of FIG. 5A. Referring to FIGS. 3, 5A and 5B, the backlight module 200 of FIG. 3 further includes a fixing frame 260, and the light sources 220 are fixed to the fixing frame 260. Concretely speaking, two opposite sidewalls 262 and 264 of the fixing frame 260 respectively define a plurality of fixing grooves 266. The fixing grooves 266 on the sidewall 262 respectively correspond to the fixing grooves 266 on the sidewall 264. Two ends of each light source 220 are fixedly received in the two corresponding fixing grooves 266.

Figure 6:
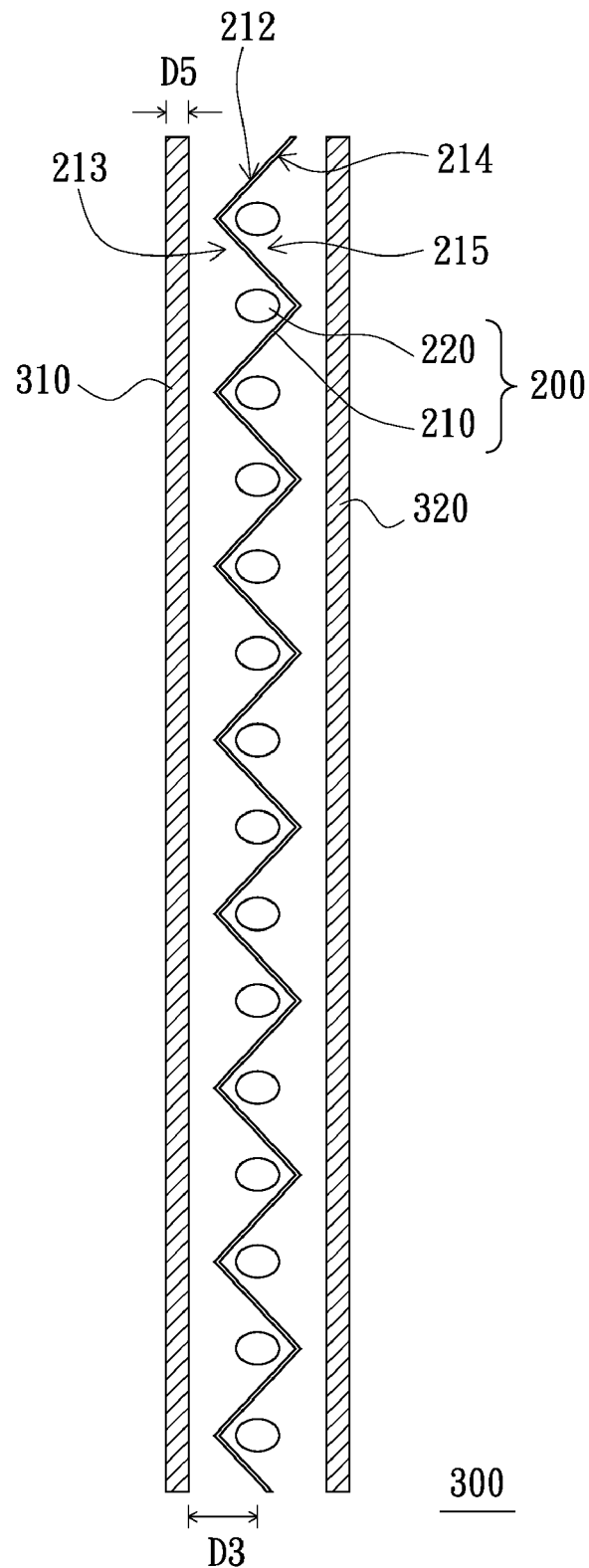
FIG. 6 is a schematic view of a double-sided liquid crystal display device applying the backlight module of FIG. 3.
Figure 7:
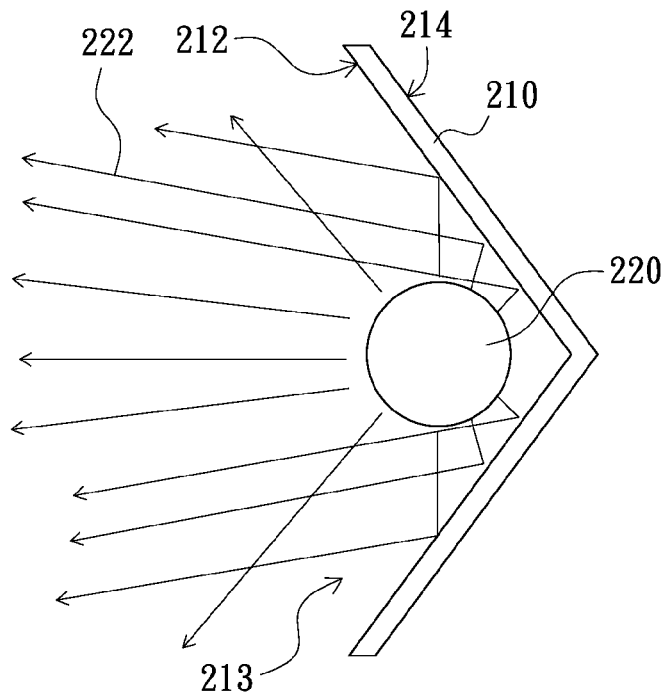
FIG. 7 is a schematic view showing transmission paths of the light provided by the light source of the backlight module of FIG. 3.

FIG. 6 is a schematic view of a double-sided liquid crystal display device applying the backlight module of FIG. 3, and FIG. 7 is a schematic view showing transmission paths of the light provided by the light source of the backlight module of FIG. 3. Referring to FIGS. 6 and 7, the double-sided liquid crystal display device 300 includes two liquid crystal display panel 310 and 320 and the above-mentioned backlight module 200. The backlight module 200 is disposed between the liquid crystal display panels 310 and 320 for providing light 222 to the liquid crystal display panels 310 and 320. More concretely, the light sources 220 located in the first grooves 213 are for providing light 222 to the liquid crystal display panel 310, while the light sources 220 located in the second grooves 215 are for providing light 222 to the liquid crystal display panel 320. Furthermore, the first surface 212 of the plate 210 faces the liquid crystal display panel 310 and is for reflecting a part of the light 222 provided by the light sources 220 to the liquid crystal display panel 310. The second surface 214 of the plate 210 faces the liquid crystal display panel 320 and is for reflecting another part of the light 222 provided by the light sources 220 to the liquid crystal display panel 320.

Figure 1:
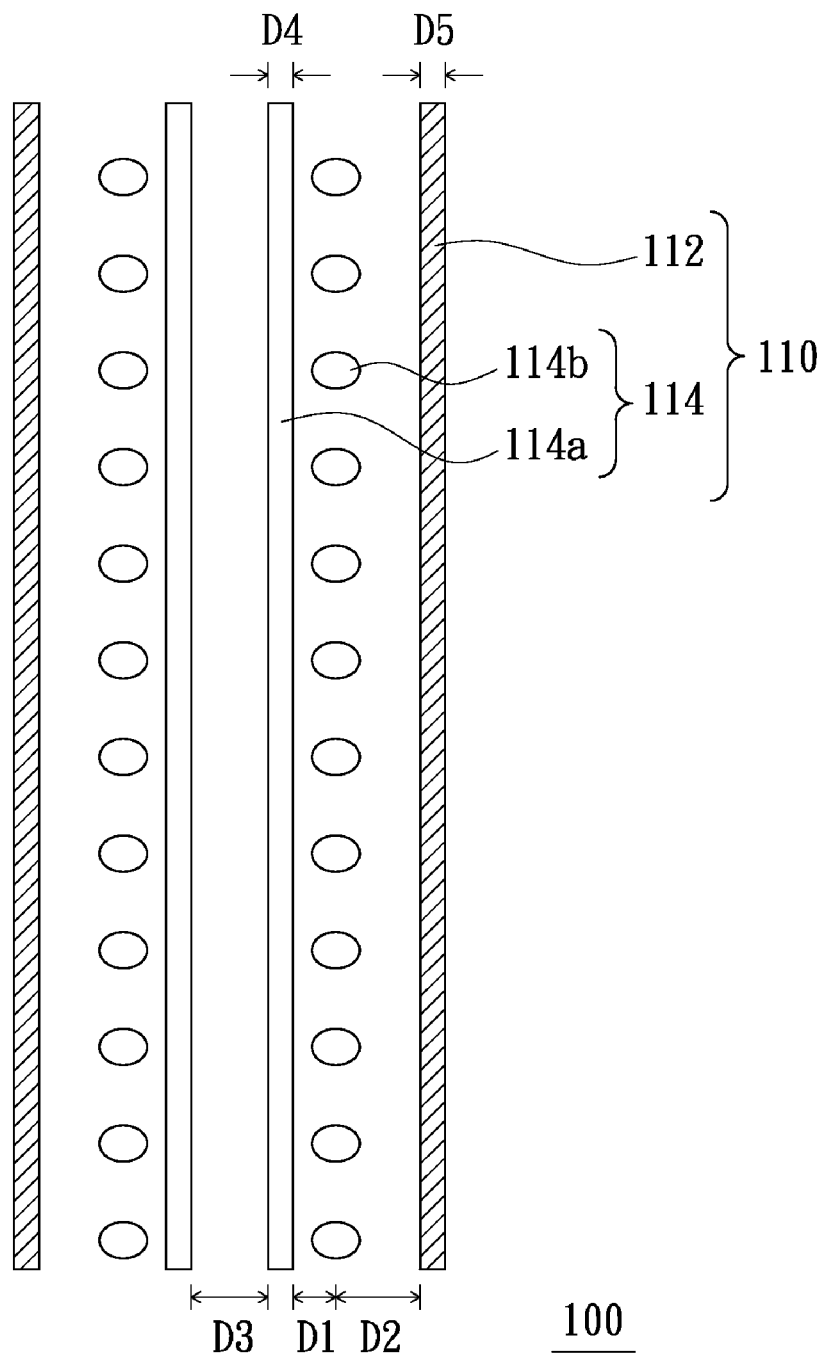
FIG. 1 is a schematic view of a conventional double-sided liquid crystal display device.
Figure 2:
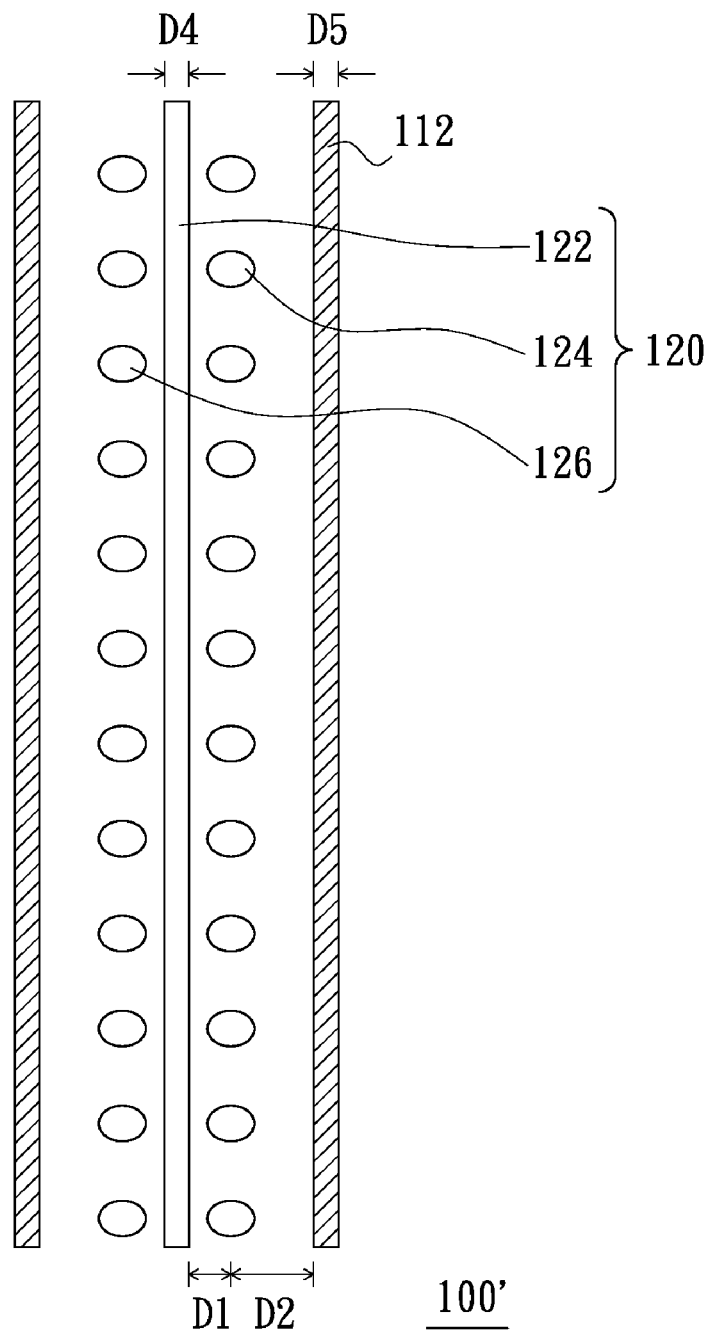
FIG. 2 is a schematic view of another conventional double-sided liquid crystal display device.

Because the plate 210 of the backlight module 200 is bent to form the first grooves 213 on the first surface 212 and the second grooves 215 on the second surface 214, the light sources 220 disposed in the first grooves 213 and the light sources 220 disposed in the second grooves 215 are substantially located in one reference plane. Because the light sources 220 for providing the light 222 to different liquid crystal display panels 310 and 320 are substantially located in one reference plane, the backlight module 200 of the present embodiment has thinner thickness as compared to the conventional art. Therefore, the thickness of the double-sided liquid crystal display device 300 applying the backlight module 200 may become thinner. More Specifically, the distance between the center of the light source 220 and its corresponding liquid crystal display panel 310/320 equals to that of the conventional art (both of them are D2), and the thickness of each of the liquid crystal display panels 310 and 320 equals to that of the conventional art (both of them are D5), the thickness of the double-sided liquid crystal display device 300 is 2*(D2+D5). As compared to the conventional double-sided liquid crystal display device 100 of FIG. 1, the decreased thickness of the double-sided liquid crystal display device 300 is 2*(D1+D4)+D3. As compared to the conventional double-sided liquid crystal display device 100' of FIG. 2, the decreased thickness of the double-sided liquid crystal display device 300 is 2*D1+D4. Therefore, as compared to the conventional arts, the thickness of the double-sided liquid crystal display device 300 is greatly decreased.

Moreover, in this embodiment, the first grooves 213 and the second grooves 215 are V-shaped grooves, the light 222 are converged after they are reflected by the surfaces of the V-shaped grooves (i.e., the first surface 212 and the second surface 214), and thus the plate 210 has light convergence effect (referring to FIG. 7). Therefore, the light utilization efficiency of the backlight module 200 is increased, and the application amount of the light source 220 is accordingly decreased.

Figure 8:
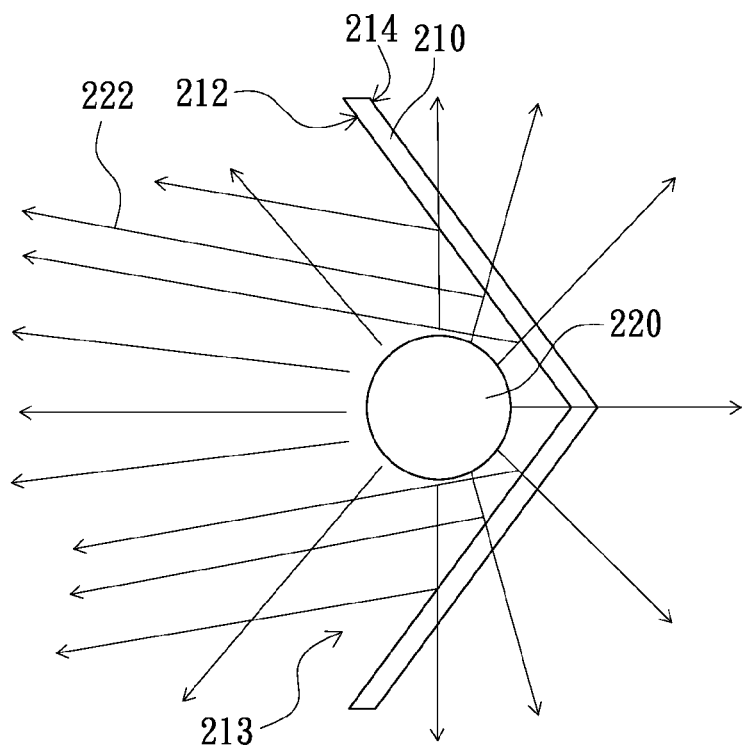
FIG. 8 is a schematic view showing transmission paths of the light provided by the light source when the plate is made of transparent material.

Referring to FIGS. 7 and 8, it should be noted that the plate 210 may be made of transparent material or opacity material. The transparent material is suitable for reflecting a part of the light 222 and passing through another part of the light 222. For example, the reflection rate of the transparent material is 80%, and the light penetration rate of the transparent material is 20%. In the condition that the plate 210 is made of the transparent material, a part of the light 222 provided by the light sources 220 in the first grooves 213 or the second grooves 215 can pass through the plate 210 and transmit to the liquid crystal display panel 310/320 disposed at the other side of the plate 210, and this preventing visible dark areas from being formed in frames displayed by the liquid crystal display panels 310 and 320. Therefore, the luminance uniformity of the double-sided liquid crystal display device 300 is improved.

Figure 9:
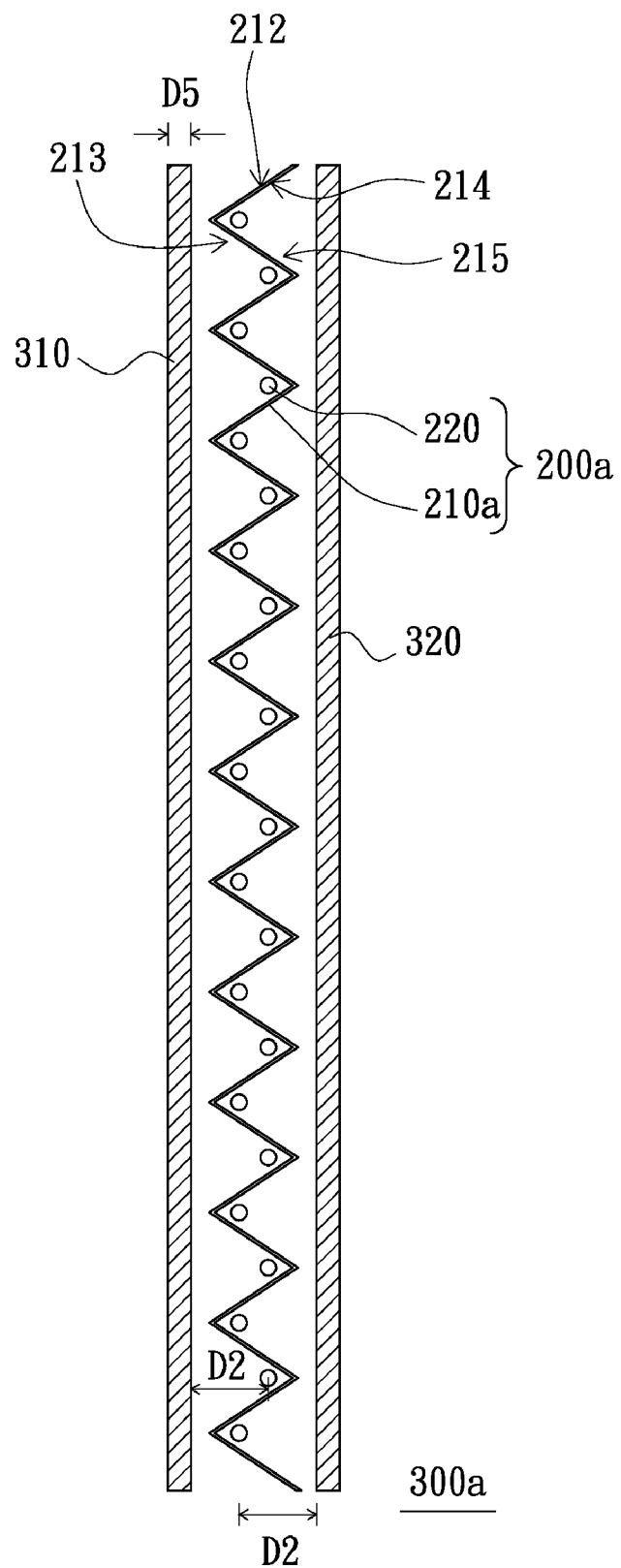
FIG. 9 is a schematic view of a double-sided liquid crystal display device applying a backlight module of another embodiment of the present invention.

FIG. 9 is a schematic view of a double-sided liquid crystal display device applying a backlight module of another embodiment of the present invention. Referring to FIG. 9, in the backlight module 200a of the another embodiment, the depths of the first grooves 213 formed on the first surface 212 of the plate 210a and the depths of the second grooves 215 formed on the second surface 214 of the plate 210a are increased, so the light sources 220 in the first grooves 213 and the light sources 220 in the second grooves 215 can be located at two different sides of one reference plane. Thereby, the thickness of the double-sided liquid crystal display device 300a can be further decreased to be smaller than 2*(D2+D5).

Figure 10:
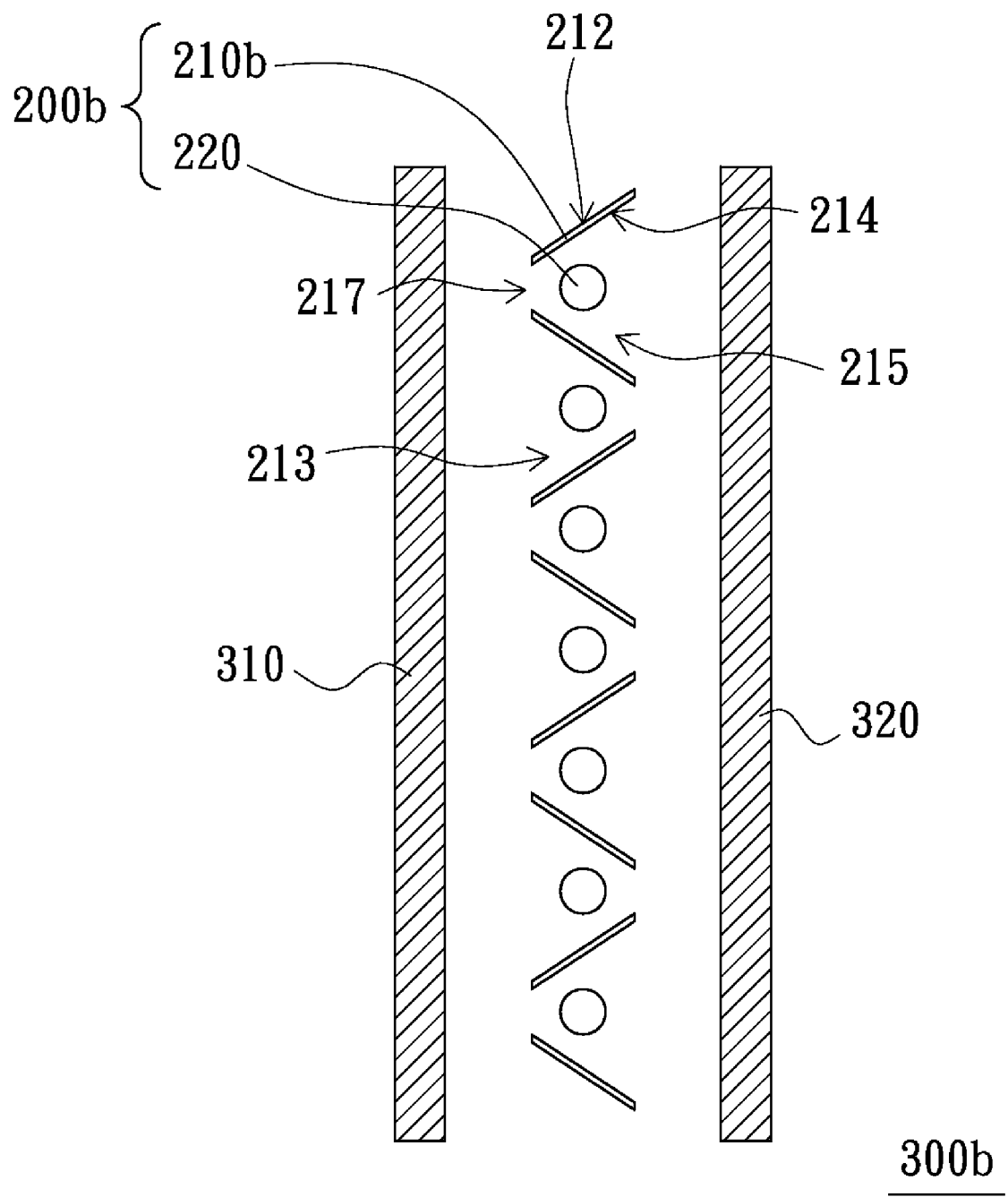
FIG. 10 is a schematic view of a double-sided liquid crystal display device applying a backlight module of another embodiment of the present invention.

FIG. 10 is a schematic view of a double-sided liquid crystal display device applying a backlight module of another embodiment of the present invention. Referring to FIG. 10, in the backlight module 300b of the another embodiment, both of the first surface and the second surface 212 and 214 of the plate 210b are reflection surfaces, while bottom portions of the first grooves 213 and the second grooves 215 respectively have an opening 217. A part of the light provided by the light sources 220 in the first grooves 213 may transmit to the liquid crystal display panel 320 through the openings 217, while a part of the light provided by the light sources 220 in the second grooves 215 may transmit to the liquid crystal display panel 310 through the openings 217, so as to prevent visible dark areas from being formed in frames displayed by the liquid crystal display panels 310 and 320. Therefore, the luminance uniformity of the double-sided liquid crystal display device 300b is improved.

Figure 11:
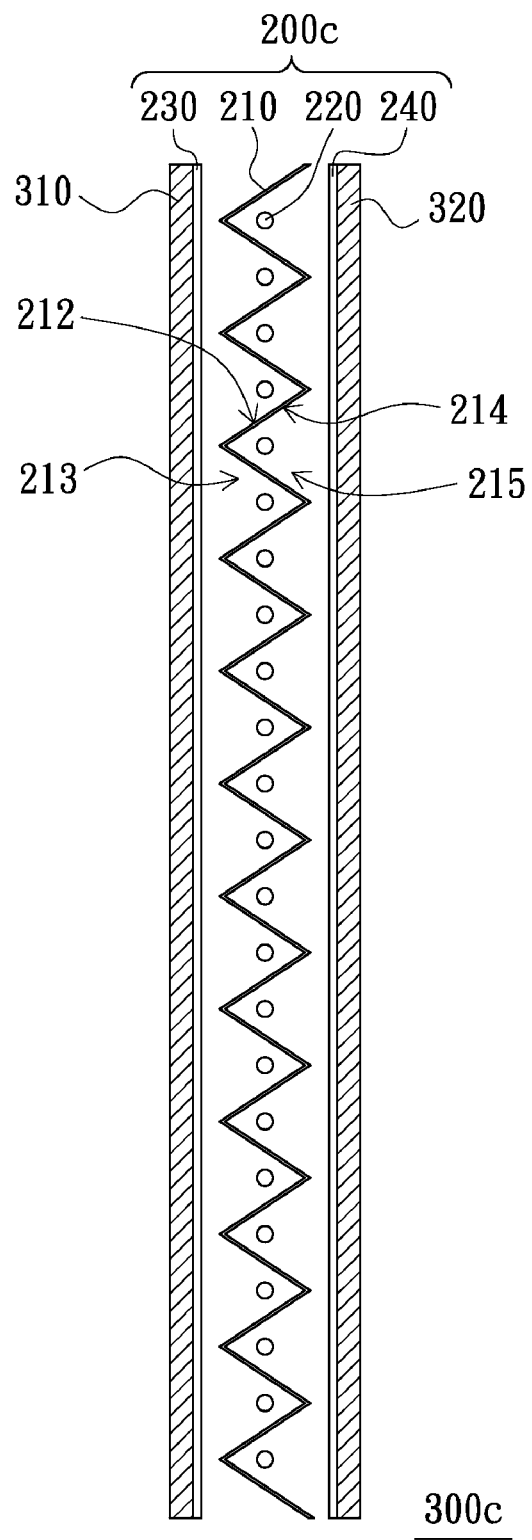
FIG. 11 is a schematic view of a double-sided liquid crystal display device applying a backlight module of another embodiment of the present invention.

FIG. 11 is a schematic view of a double-sided liquid crystal display device applying a backlight module of another embodiment of the present invention. Referring to FIG. 11, the double-sided liquid crystal display device 300c is similar to the double-sided liquid crystal display device 300 of FIG. 6, the difference is that the backlight module 200c of the double-sided liquid crystal display device 300c further includes a first optical sheet 230 and a second optical sheet 240. The first optical sheet 230 faces the first surface 212 of the plate 210, while the second optical sheet 240 faces the second surface 214 of the plate 210. The first optical sheet 230 and the second optical sheet 240 may respectively include diffusion plate, diffusion sheet, brightness enhancement film (BEF), or etc. The first optical sheet 230 and the second optical sheet 240 are for uniforming the light to increase the luminance uniformity of the double-sided liquid crystal display device 300c.

Figure 12:
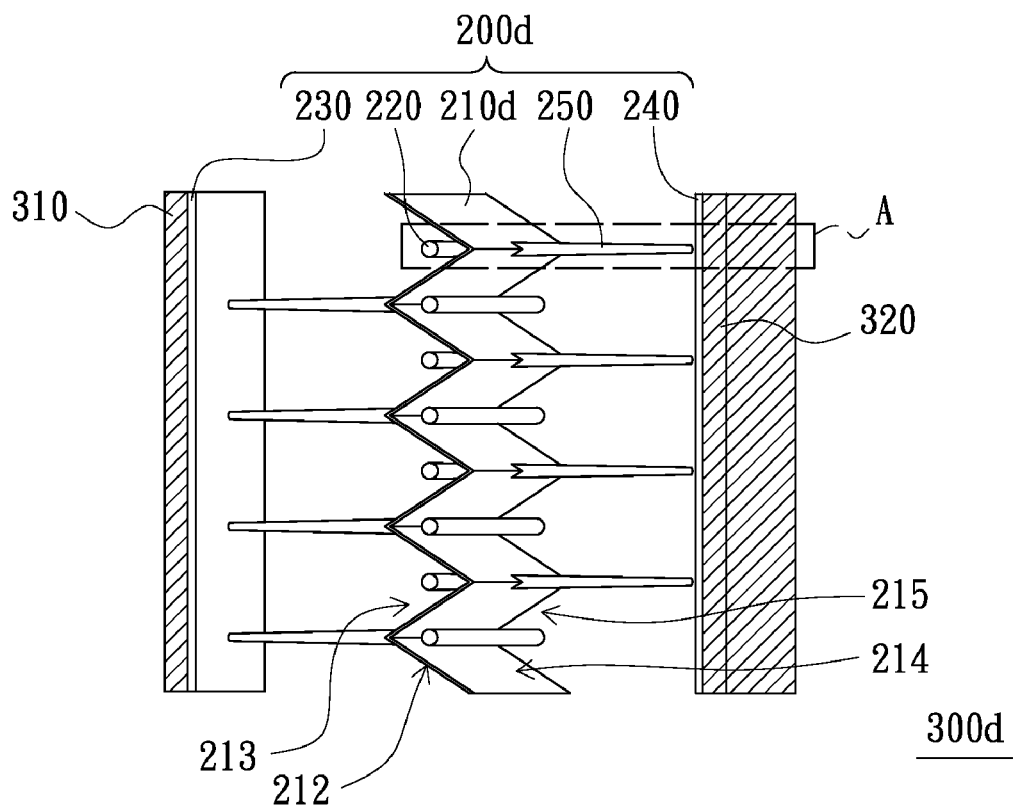
FIG. 12 is a schematic view of a double-sided liquid crystal display device applying a backlight module of another embodiment of the present invention.
Figure 13:
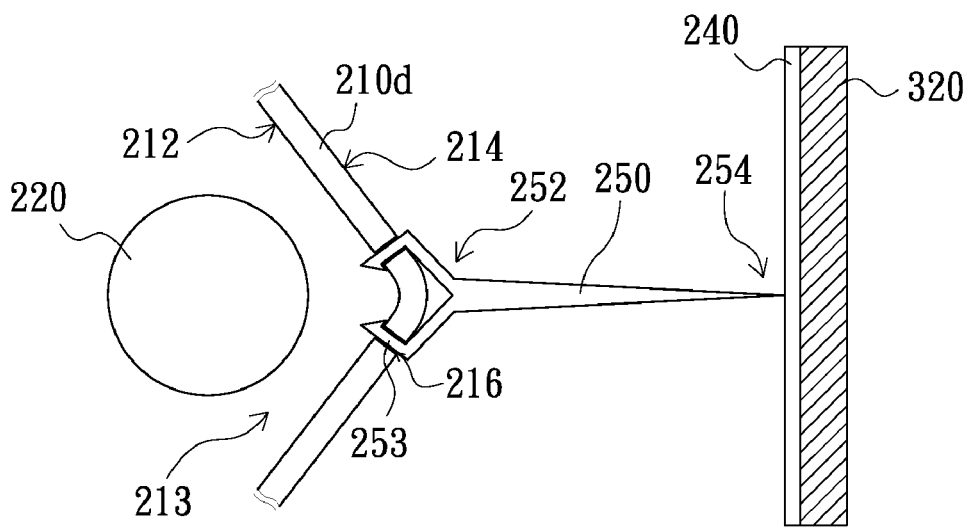
FIG. 13 is a schematic cross-section view of area A of FIG. 12.

FIG. 12 is a schematic view of a double-sided liquid crystal display device applying a backlight module of another embodiment of the present invention, and FIG. 13 is a schematic cross-section view of area A of FIG. 12. Referring to FIGS. 12 and 13, the double-sided liquid crystal display device 300d is similar to the double-sided liquid crystal display device 300c, the difference is that the backlight module 200d of the double-sided liquid crystal device 300d further includes a plurality of support members 250. The support members 250 are abutted between the first optical sheet 230 and the plate 210d, and between the second optical sheet 240 and the plate 210d, for keeping adequate distances between the plate 210d and the liquid crystal display panels 310 and 320. Concretely, each support member 250 includes a fixing end 252 and a top end 254 opposite to the fixing end 252. The fixing end 252 includes at least a hook 253, and in this embodiment the fixing end 252 includes, for example, two hooks 253. The top ends 254 of some of the support members 250 are abutted against the first optical sheet 230 and the top ends 254 of the other of the support members 250 are abutted against the second optical sheet 240. The plate 210d has a plurality of through holes 216 corresponding to the hooks 253 of the support members 250. The through holes 216 are disposed at the bottom portions of the first grooves 213 and the second grooves 215, and the hooks 253 of the support members 250 pass through the corresponding through holes 216 and are fixed to the plate 210d.

Figure 14:
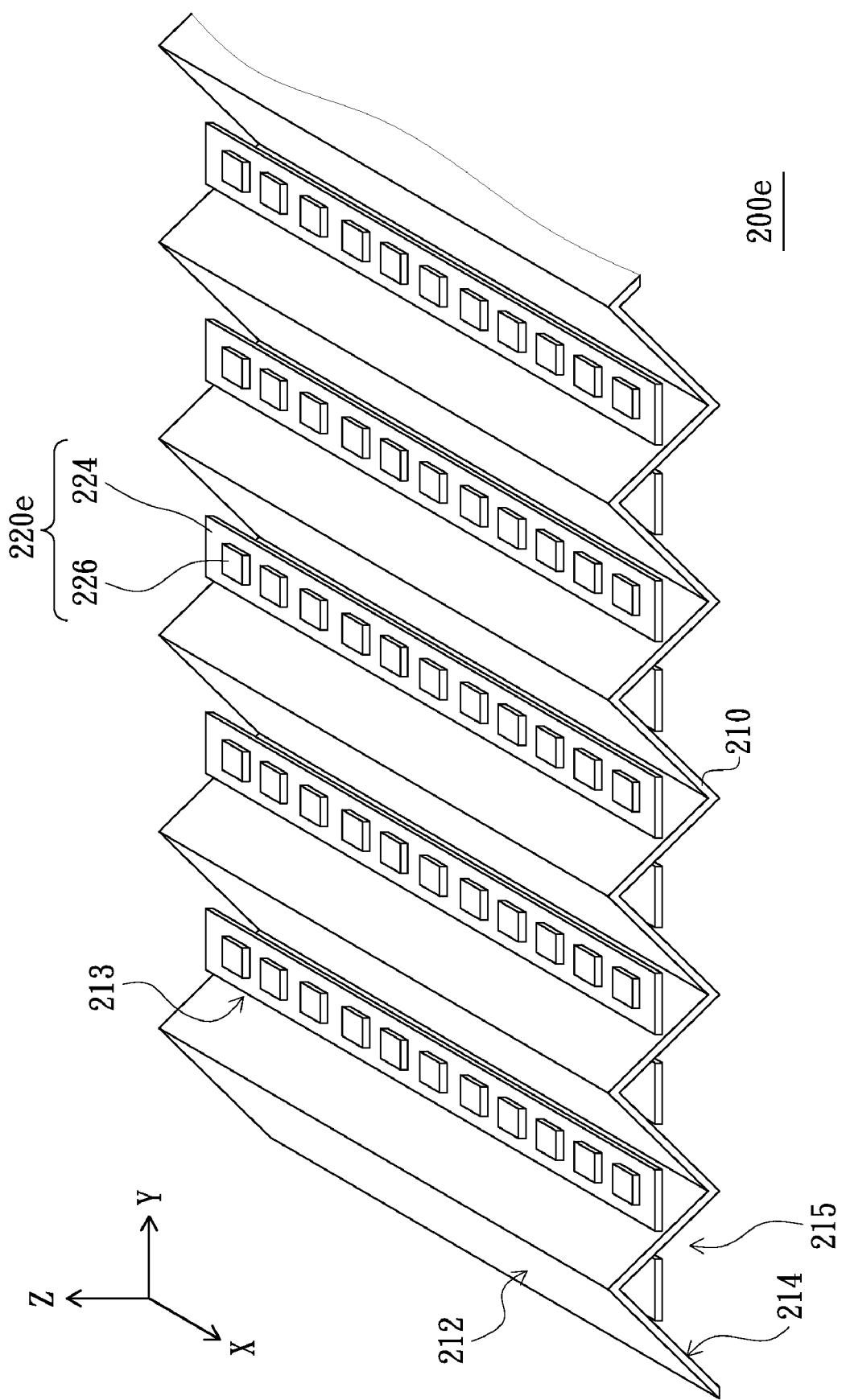
FIG. 14 is a schematic three-dimensional view of a backlight module according to another embodiment of the present invention.

FIG. 14 is a schematic three-dimensional view of a backlight module according to another embodiment of the present invention. Referring to FIG. 14, the backlight module 200e of the present embodiment is similar to the backlight module 200 of FIG. 3, the difference is that each of the light sources 220 of the backlight module 200 is a cold cathode fluorescent lamp, while each of the light sources 220e of the backlight module 200e includes a strip substrate 224 and at least a point light source 226 disposed on the strip substrate 224. Extension directions of the strip substrates 224 substantially parallel to the extension directions of the first grooves 213 and the second grooves 215. In the present embodiment, the extension directions of the strip substrates 224, the first grooves 213 and the second grooves 215 are, for example, parallel to X-axis. Furthermore, in the embodiment that each of the light sources 220e includes a plurality of point light sources 226, the point light sources 226 are arranged on the strip substrate 224 along X-axis. The point light sources 226 are, for example, light emitting diode (LED), but are not limited.

The advantages of the backlight module 200e of the present embodiment are similar to that of the backlight module 200, and the fixing manner of the light sources 220e is similar to that of the light sources 220 of FIGS. 5A and 5B. It should be noted that all the light sources 220 in the above-mentioned embodiments can be replaced by the light source 220e of the present embodiment.

Figure 15:
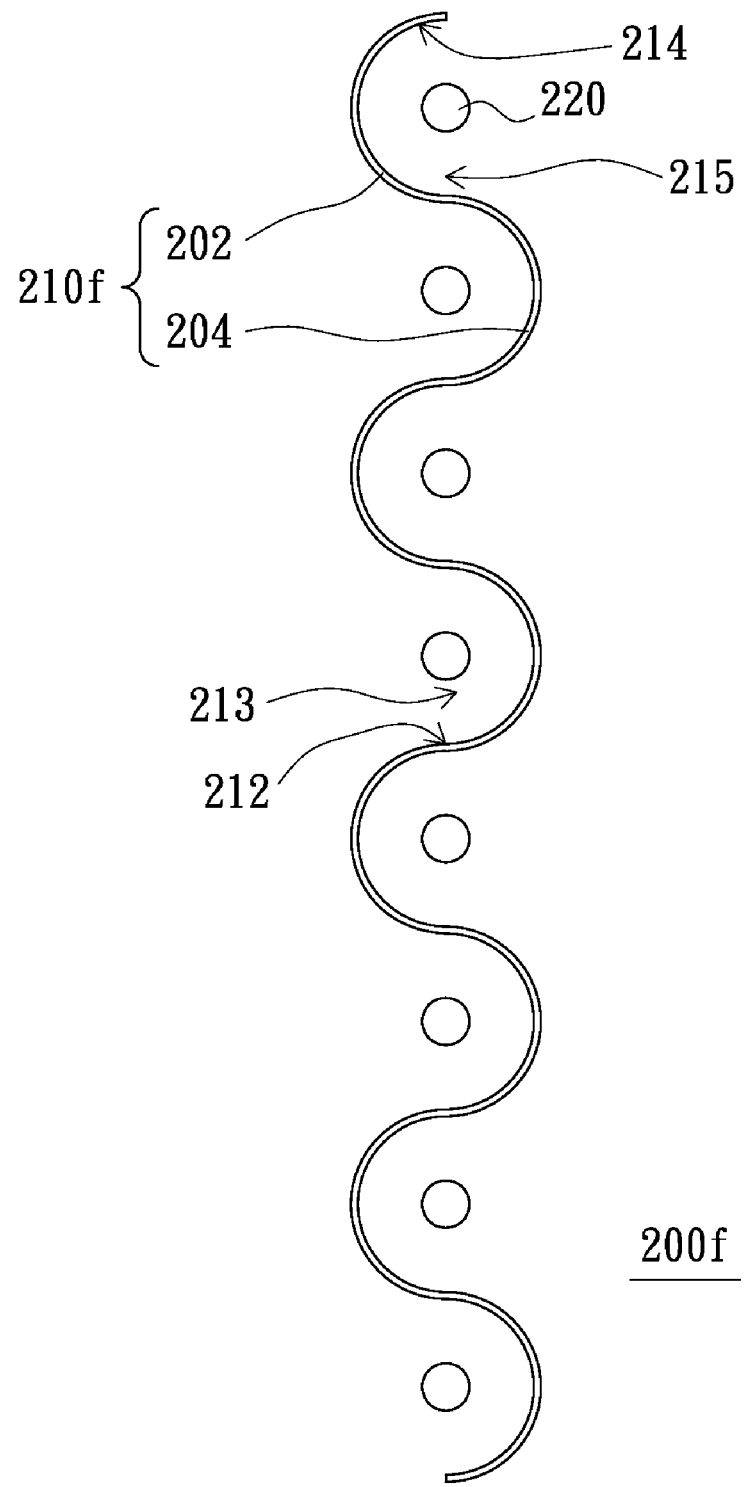
FIG. 15 is a schematic view of a backlight module according to another embodiment of the present invention.

FIG. 15 is a schematic view of a backlight module according to another embodiment of the present invention. Referring to FIG. 15, the backlight module 200f of the present embodiment is similar to the backlight module 200 of FIG. 3, and the difference is the configuration of the plate. Concretely, the first grooves 213 formed on the first surface 212 of the plate 210f and the second grooves 215 formed on the second surface 214 of the plate 210f are semi-circular grooves, and the second grooves 215 are separately disposed between the first grooves 213. Furthermore, the plate 210f of the present embodiment may be composed of a plurality of first semi-circular plates 202 and a plurality of second semi-circular plates 204, wherein concave surfaces of the first semi-circular plates 202 and concave surfaces of the second semi-circular plates 204 face different sides of the plate 201f. The concave surfaces of the first semi-circular plates 202 are the bottom surfaces of the second grooves 215, while the concave surfaces of the second semi-circular plates 204 are the bottom surfaces of the first grooves 213. The advantages of the backlight module 200f of the present embodiment are similar to that of the backlight module 200.

Figure 16:
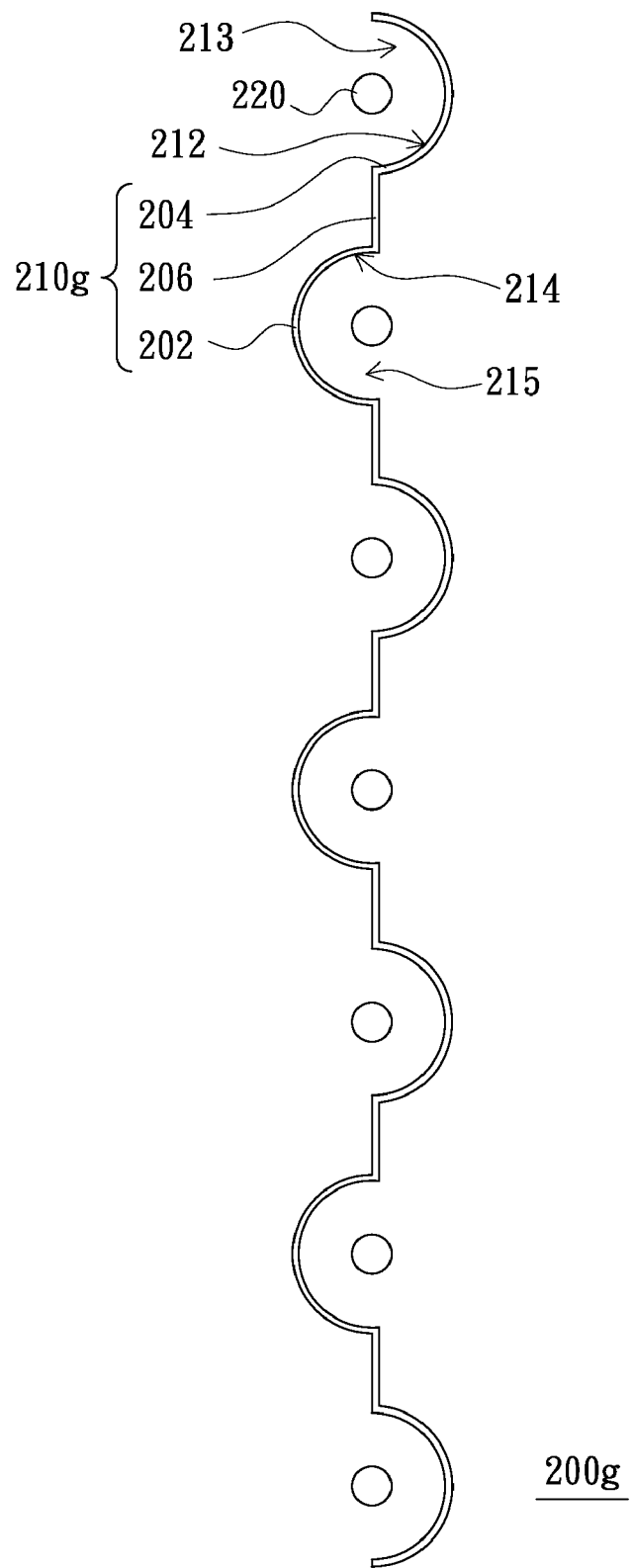
FIG. 16 is a schematic view of a backlight module according to another embodiment of the present invention.

FIG. 16 is a schematic view of a backlight module according to another embodiment of the present invention. Referring to FIG. 16, as compared to the backlight module 200f of the FIG. 15, the plate 210g of the backlight module 200g of the present embodiment further includes a plurality of flat plates 206. Each of the flat plates 206 is connected between the adjacent first semi-circular plate 202 and second semi-circular plate 204. The advantages of the backlight module 200g of the present embodiment are similar to that of the backlight module 200.

Figure 17:
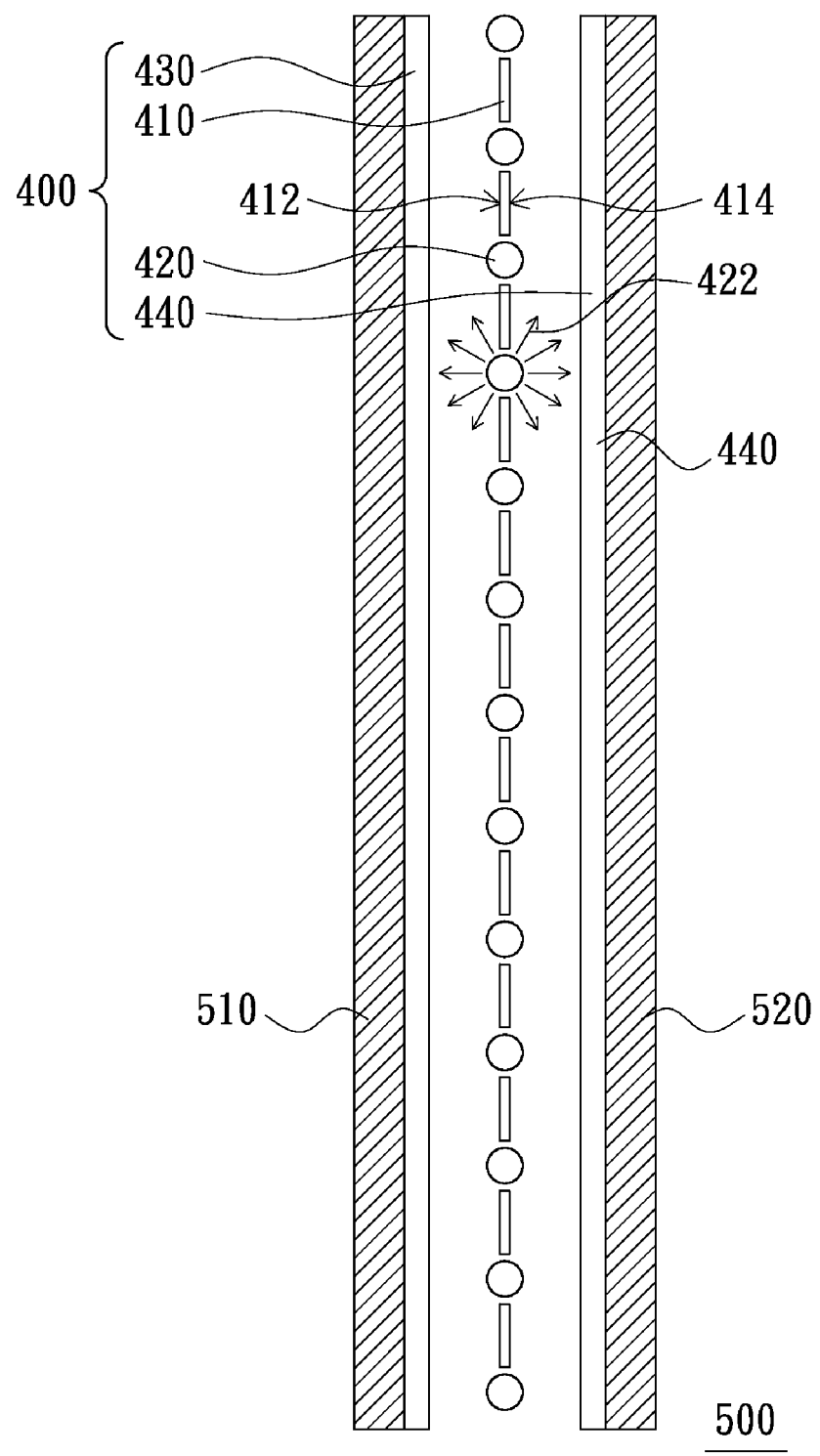
FIG. 17 is a schematic view of a double-sided liquid crystal display device applying a backlight module of another embodiment of the present invention.

FIG. 17 is a schematic view of a double-sided liquid crystal display device applying a backlight module of another embodiment of the present invention. Referring to FIG. 17, the double-sided liquid crystal display device 500 includes two liquid crystal display panels 510 and 520 and a backlight module 400 disposed between the liquid crystal display panels 510 and 520. The backlight module 400 includes a plurality of plates 410, a plurality of light sources 420, a first optical sheet 430 and a second optical sheet 440. The first optical sheet 430 faces the second optical sheet 440, the first optical sheet 430 faces the first liquid crystal display panel 510, while the second optical sheet 440 faces the second liquid crystal display panel 520. The light sources 420 are disposed between the first optical sheet 430 and the second optical sheet 440, the plates 410 are separately disposed between the light sources 420. Each of the light sources 420 is suitable for providing light 422 to the first optical sheet 430 and the second optical sheet 440. Each of the plates 410 has a first surface 412 and a second surface 414 opposite to the first surface 412, and both of the first surface 412 and the second surface 414 are reflection surfaces.

In the above-mentioned backlight module 400, each of the light sources 420 is, for example, a cold cathode fluorescent lamp. Each of the plates 410 is, for example, a flat plate. The plates 410 may be made of opacity material for providing light barrier capability. Therefore, when the backlight module 400 is applied to a double-sided liquid crystal display device, the plates 410 may prevent lookers from seeing the other frame when they are seeing one of the frames.

In this embodiment, because the light sources 420 for providing light 422 to the first optical sheet 430 and the light sources 420 for providing light 422 to the second optical sheet 440 may be located on one reference plane, the thickness of the backlight module 400 is decreased. Therefore, the double-sided liquid crystal display device applying the present backlight module 400 has thinner thickness.

Figure 18:
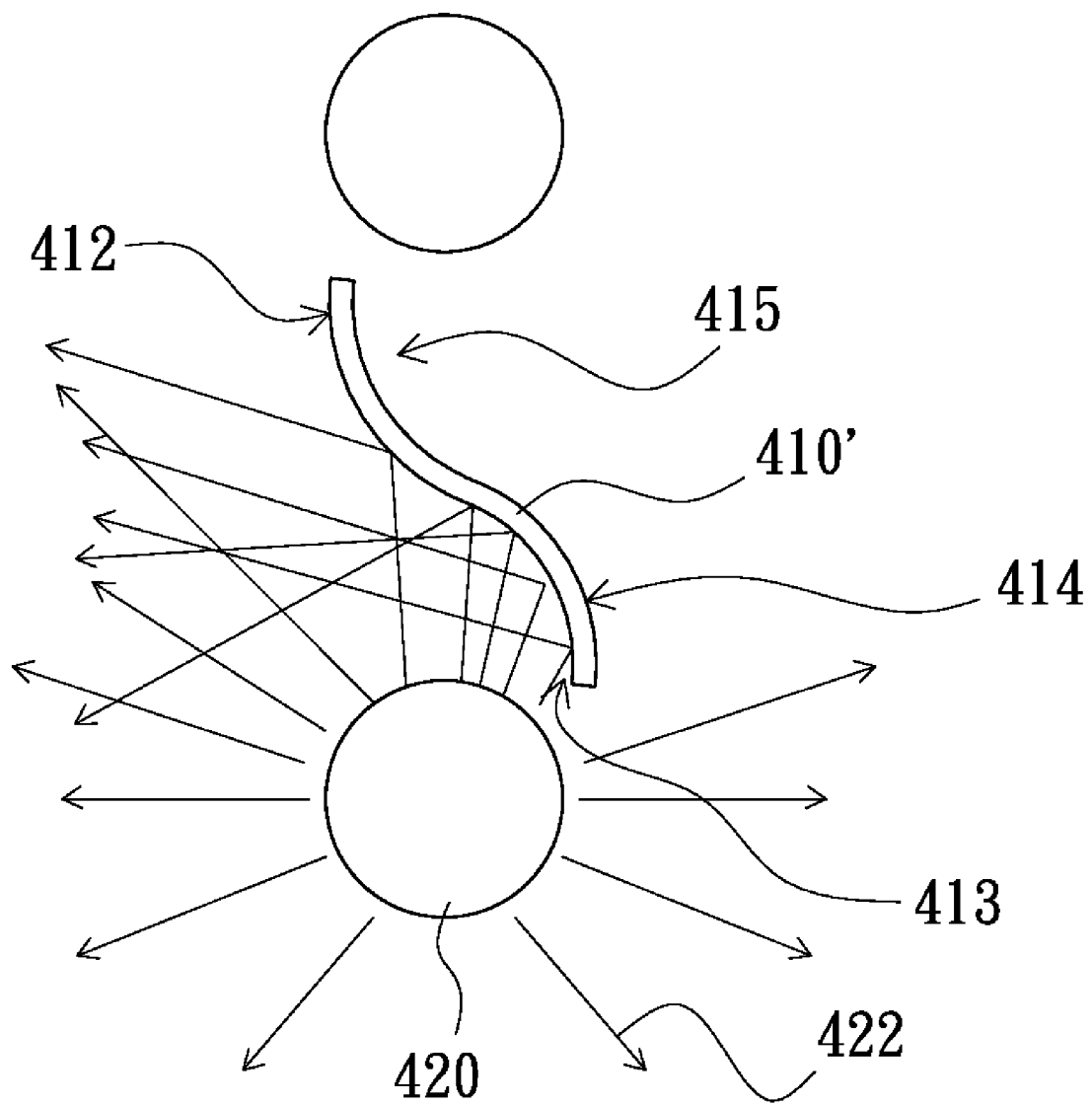
FIG. 18 is a schematic view showing a plate and transmission paths of the light provided by the light sources according to another embodiment of the present invention.

It should be noted that the plates are not limited to be flat plates. For example, the plates 410 can be replaced by the plates 410' of FIG. 18 or plates with other configurations. The plates 410' is bent to form first arc grooves 413 on the first surface 412 and second arc grooves 415 on the second surface 414. The arc grooves 413 and 415 have light convergence effect for increasing light utilization efficiency of the backlight module. Moreover, the fixing manner of the light sources 420 is similar to that of the light sources 220 of FIGS. 5A and 5B.

Figure 19:
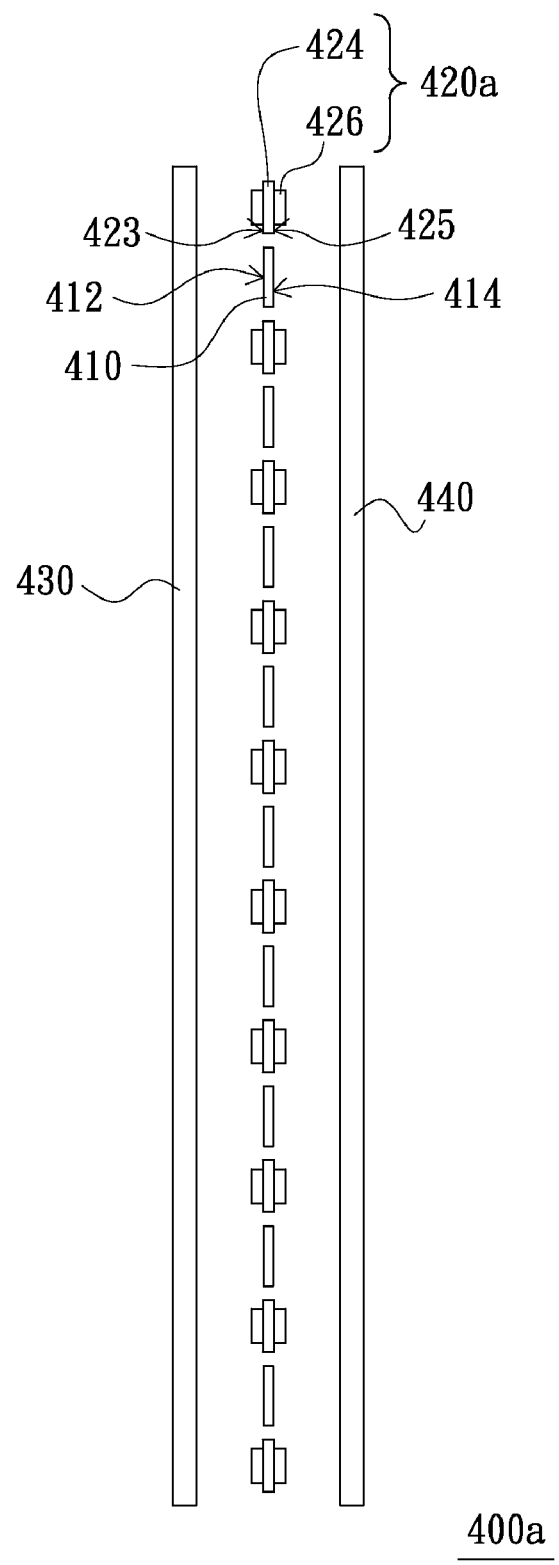
FIG. 19 is a schematic view of a backlight module according to another embodiment of the present invention.
Figure 20:
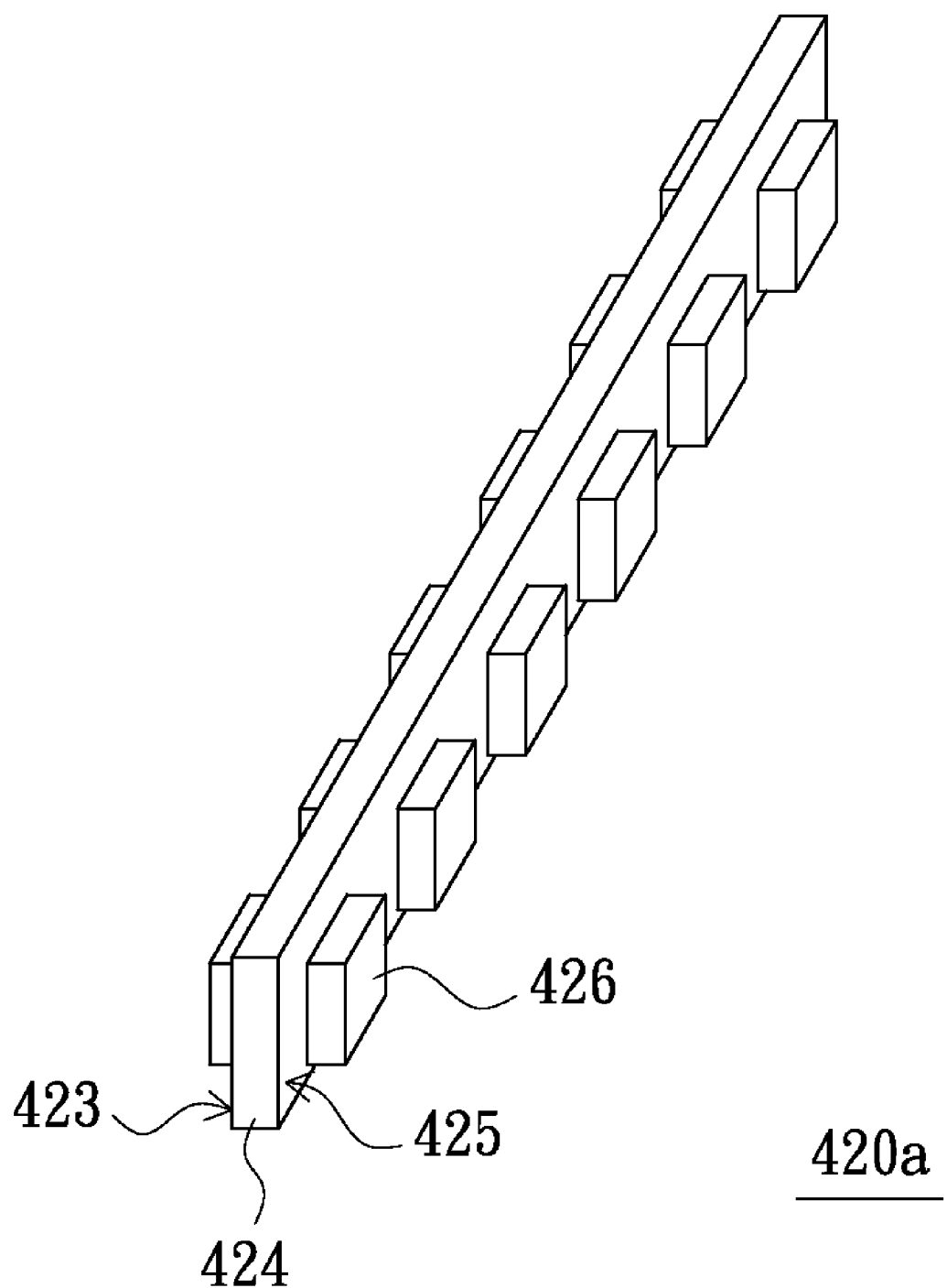
FIG. 20 is a schematic three-dimensional view of one of the light sources of FIG. 19.

FIG. 19 is a schematic view of a backlight module according to another embodiment of the present invention, and FIG. 20 is a schematic three-dimensional view of one of the light sources of FIG. 19. Referring to FIGS. 19 and 20, the backlight module 400a of the present embodiment is similar to the backlight module 400 of FIG. 17, and the difference is the light sources. Each of the light sources 420a of the backlight module 400a includes a strip substrate 424 and at least two point light sources 426. The strip substrate 424 has a third surface 423 and a fourth surface 425 opposite to the third surface 423. The point light sources 426 are respectively disposed on the third surface 423 and the fourth surface 425. The point light sources 426 may be light emitting diode, but are not limited. The advantages of the backlight module 400a of the present embodiment are similar to that of the backlight module 400, and the fixing manner of the light sources 420a is similar to that of the light sources 220 of FIGS. 5A and 5B.

In summary, in the backlight module of each embodiment of the present invention, because the light sources for providing light to different liquid crystal display panels may be located on one reference plane, the thickness of the backlight module is therefore decreased. Because the backlight module has thinner thickness, the double-sided liquid crystal display device applying such backlight module accordingly has thinner thickness. Furthermore, in the present invention, the plate is bent to form V-shaped grooves, or semi-circular grooves to provide light convergence effect. Therefore, the light utilization efficiency of the backlight module is increased and the application amount of the light sources is decreased. Thus, the electricity consumption and the manufacture cost of the backlight module of the present invention are accordingly decreased.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A backlight module comprising:
a plate having a first surface and a second surface opposite to the first surface, wherein the plate is bent to form a plurality of first grooves on the first surface and a plurality of second grooves on the second surface; and
a plurality of light sources respectively disposed in the first grooves and the second grooves, wherein the light sources in the first grooves and the light sources in the second grooves are located at two different sides of one reference plane.

2. The backlight module as claimed in claim 1, wherein each of the light sources includes a cold cathode fluorescent lamp, and extension directions of the light sources are parallel to extension directions of the first grooves and the second grooves.

3. The backlight module as claimed in claim 1, wherein each of the light sources includes a strip substrate and at least a point light source disposed on the strip substrate, and extension directions of the strip substrates are parallel to extension directions of the first grooves and the second grooves.

4. The backlight module as claimed in claim 1, wherein the first grooves and the second grooves are V-shaped grooves, and the second grooves are separately disposed between the first grooves.

5. The backlight module as claimed in claim 1, wherein the plate includes a plurality of V-shaped plates.

6. The backlight module as claimed in claim 5, wherein each of the V-shaped plates is composed of two flat plates.

7. The backlight module as claimed in claim 1, wherein the first grooves and the second grooves are semi-circular grooves, and the second grooves are separately disposed between the first grooves.

8. The backlight module as claimed in claim 1, wherein the plate includes a plurality of first semi-circular plates and a plurality of second semi-circular plates, and concave surfaces of the first semi-circular plates and concave surfaces of the second semi-circular plates face different sides of the plate.

9. The backlight module as claimed in claim 8, wherein the plate further includes a plurality of flat plates, and each of the flat plates is connected between the adjacent first semi-circular plate and second semi-circular plate.

10. The backlight module as claimed in claim 1, wherein both of the first surface and the second surface are reflection surfaces.

11. The backlight module as claimed in claim 10, wherein bottom portions of the first grooves and the second grooves respectively have an opening.

12. The backlight module as claimed in claim 1, wherein a material of the plate comprises transparent material, and the transparent material is suitable for reflecting a part of light and passing through another part of the light.

13. The backlight module as claimed in claim 1, further comprising:
a first optical sheet facing the first surface of the plate; and a second optical sheet facing the second surface of the plate.

14. The backlight module as claimed in claim 13, further comprising a plurality of support members abutted between the first optical sheet and the plate and between the second optical sheet and the plate.

15. The backlight module as claimed in claim 14, wherein each of the support members includes a fixing end and a top end opposite to the fixing end, the top end of the support member is abutted against the first optical sheet or the second optical sheet, the fixing end includes at least a hook, the plate has a plurality of through holes corresponding to the hooks of the fixing ends, the through holes are disposed at bottom portions of the first grooves and the second grooves, and the hooks pass through the corresponding through holes and are fixed to the plate.

16. A double-sided liquid crystal display device, comprising:
 two liquid crystal display panels; and
 a backlight module disposed between the liquid crystal display panels, and the backlight module comprising:
  a plate having a first surface and a second surface opposite to the first surface, and the first surface and the second surface facing different liquid crystal display panels, wherein the plate is bent to form a plurality of first grooves on the first surface and a plurality of second grooves on the second surface; and
  a plurality of light sources respectively disposed in the first grooves and the second grooves, wherein the light sources in the first grooves and the light sources in the second grooves are located at two different sides of one reference plane.

17. A backlight module comprising:
 a plate having a first surface and a second surface opposite to the first surface, wherein the plate is bent to form a plurality of first grooves on the first surface and a plurality of second grooves on the second surface; and
 a plurality of light sources respectively disposed in the first grooves and the second grooves, wherein the light sources in the first grooves are arranged in a first line, the light sources in the second grooves are arranged in a second line different from the first line.

18. A double-sided liquid crystal display device, comprising:
 two liquid crystal display panels; and
 a backlight module disposed between the liquid crystal display panels, and the backlight module comprising:
  a plate having a first surface and a second surface opposite to the first surface, and the first surface and the second surface facing different liquid crystal display panels, wherein the plate is bent to form a plurality of first grooves on the first surface and a plurality of second grooves on the second surface; and
  a plurality of light sources respectively disposed in the first grooves and the second grooves, wherein the light sources in the first grooves are arranged in a first line, the light sources in the second grooves are arranged in a second line different from the first line.

* * * * *